(12) United States Patent
Xu et al.

(10) Patent No.: US 11,879,045 B2
(45) Date of Patent: Jan. 23, 2024

(54) POLYMER BASED SENSORS FOR DETECTING AGRICULTURAL ANALYTES AND METHODS OF MAKING SAME

(71) Applicant: Georgia Tech Research Corporation, Atlanta, GA (US)

(72) Inventors: Jie Xu, Atlanta, GA (US); Douglas Britton, Atlanta, GA (US)

(73) Assignee: GEORGIA TECH RESEARCH CORPORATION, Atlanta, GA (US)

(*) Notice: Subject to any disclaimer, the term of this patent is extended or adjusted under 35 U.S.C. 154(b) by 244 days.

(21) Appl. No.: 17/124,709

(22) Filed: Dec. 17, 2020

(65) Prior Publication Data

US 2021/0179798 A1    Jun. 17, 2021

Related U.S. Application Data

(60) Provisional application No. 62/948,888, filed on Dec. 17, 2019.

(51) Int. Cl.
  *C08J 9/00* (2006.01)
  *C08J 9/12* (2006.01)
  *G01N 21/77* (2006.01)
  *C08J 9/14* (2006.01)

(52) U.S. Cl.
  CPC .......... *C08J 9/142* (2013.01); *G01N 21/7703* (2013.01); *C08J 2203/12* (2013.01); *C08J 2383/04* (2013.01); *G01N 2021/7709* (2013.01); *G01N 2600/00* (2013.01)

(58) Field of Classification Search
  CPC .... C08J 9/142; C08J 2203/12; C08J 2383/04; G01N 21/7703; G01N 2021/7709; G01N 2600/00; B01J 20/3272; B01J 20/268
  See application file for complete search history.

(56) References Cited

U.S. PATENT DOCUMENTS

| | | |
|---|---|---|
| 9,075,054 B2 | 7/2015 | Hong et al. |
| 9,134,305 B2 | 9/2015 | Cai et al. |
| 9,260,683 B2 | 2/2016 | Belbruno et al. |
| 2007/0286883 A1 | 12/2007 | Lensen |
| 2008/0317953 A1 | 12/2008 | Watkins |
| 2012/0100358 A1 | 4/2012 | Haupt et al. |
| 2012/0263922 A1 | 10/2012 | Advincula et al. |
| 2014/0329919 A1 | 11/2014 | Wyndham |

(Continued)

FOREIGN PATENT DOCUMENTS

| | | | |
|---|---|---|---|
| CN | 101644680 A | * | 2/2010 |
| WO | 2003034043 A2 | | 4/2003 |

(Continued)

OTHER PUBLICATIONS

International Search Report for PCT/US2020/065495, dated Mar. 18, 2021.

(Continued)

*Primary Examiner* — K. Boyle
(74) *Attorney, Agent, or Firm* — Barnes & Thornburg LLP

(57) ABSTRACT

A polymer-based sensor for detecting agricultural analytes is disclosed, including stable polymer-based sensing films such as molecular imprinted polymers (MIPs) that can be incorporated in sensors for detecting herbicides and pesticides, as well as methods of making the sensing films.

9 Claims, 10 Drawing Sheets

(56) References Cited

U.S. PATENT DOCUMENTS

2015/0342868 A1* 12/2015 Greaves ............... C08G 77/26
424/47
2015/0344607 A1 12/2015 Branger et al.
2016/0282341 A1 9/2016 Singamaneni et al.

FOREIGN PATENT DOCUMENTS

WO 2015130529 A2 9/2015
WO 2018009148 A1 1/2018

OTHER PUBLICATIONS

Beyki, et al., "Selective removal of dicamba from aqueous samples using molecularly imprinted polymer nanospheres", J. Water Environ. Nanotechnol. (Jul. 2016), vol. 1, No. 1, pp. 19-25.

* cited by examiner

POLYMER BASED SENSORS FOR DETECTING AGRICULTURAL ANALYTES AND METHODS OF MAKING SAME

CROSS-REFERENCE TO RELATED APPLICATION

This application claims the benefit of U.S. Provisional Patent Application No. 62/948,888, filed Dec. 17, 2019, the entire contents of which are hereby incorporated herein by reference.

BACKGROUND OF THE DISCLOSURE

Detection of agricultural analytes, particularly pesticides and herbicides, can be highly intensive and require complex equipment that is not suited to use in the field. There exists a need for highly chemical-specific materials and easy to use sensors for detection of certain agricultural analytes.

BRIEF SUMMARY OF THE DISCLOSURE

Sensors and sensor components to accurately and specifically detect agricultural analytes are provided. Embodiments of the present disclosure relate generally to polymer-based sensors for detecting agricultural analytes, and, more specifically, to stable polymer based sensing films such as molecular imprinted polymers (MIPs) for incorporation in sensors for detecting agricultural analytes and methods of making the sensing films and sensors.

In one aspect, the disclosure provides a molecularly imprinted polymer film (MIP) that includes a crosslinking organosilane, a functional organosilane, a template molecule, and a porogen. According to one embodiment, the molecular imprinted polymer is formulated as an optical transparent and mechanical stable thin film. According to one embodiment, the molecular imprinted polymer is configured to detect one or more agricultural analytes. According to one embodiment, the molecularly imprinted polymer is configured to detect one or more of an inorganic contaminant (IOC), volatile organic contaminant (VOC), synthetic organic contaminant (SOC), organic chemical, inorganic chemical, disinfection by-product, or a combination thereof. According to one embodiment, the molecularly imprinted polymer is configured to detect one or more of dicamba, dichloroprop, dichloroprop-P, 2(2, 4, 5-trichlorophenoxy) propionic acid, 2,4,5-trichlorophenoxyacetic acid, 2,4-dichlorophenoxyacetic acid (2,4-D), or any combination thereof.

According to one embodiment, the crosslinking organosilane includes tetramethoxysilane, tetraethoxysilane, trimethoxysilane, triethyoxysilane, and combinations thereof. According to one embodiment, the functional organosilane includes silanes containing amino groups and phenyl groups, preferably n-(2-n-benzylaminoethyl)-3-aminopropyltrimethoxysilane hydrochloride, p-aminophenyltrimethoxysilane, n-phenylaminomethyltrimethoxysilane, and (aminoethylaminomethyl)phenethyltrimethoxysilane. In some embodiments, the porogen includes polar and nonpolar solvents including methanol, ethanol, isopropanol, toluene, tetrahydrofuran (THF), acetonitrile, hexane, and combinations thereof.

In another aspect, the disclosure provides a method for making a molecularly imprinted polymer for detecting agricultural analytes. The molecularly imprinted polymer may be a film. The method includes the steps of:

preparing a mixture of precursors comprising a crosslinking organosilane solution and a functional organosilane solution, water, and an acid or an base;

dissolving one or more agricultural analyte in a porogen to form an agricultural analyte solution;

mixing the mixture of precursors and the agricultural analyte solution with a cross-linker and, optionally, a catalyst until a sol forms;

coating the sol on a pre-cleaned sensor surface;

drying the sol by curing the coated sensor to transform the coated sol into a xerogel;

flowing methanol over the xerogel film to remove the template molecules; and flowing working buffer over the coated sensor surface for baseline registration. Any resulting film may have a thickness controlled by the coating speed and the concentration of sol. According to one embodiment, the molecularly imprinted film is configured to detect one or more of dicamba, dichloroprop, dichloroprop-P, 2(2, 4, 5-trichlorophenoxy)propionic acid, 2,4,5-trichlorophenoxyacetic acid, and 2,4-dichlorophenoxyacetic acid (2,4-D). According to one embodiment, the crosslinking silane includes tetramethoxysilane, tetraethoxysilane, trimethoxysilane, triethyoxysilane, and combinations thereof. According to one embodiment, the functional organosilane includes silanes containing amino groups and phenyl groups, preferably n-(2-n-benzylaminoethyl)-3-aminopropyltrimethoxysilane hydrochloride, p-aminophenyltrimethoxysilane, n-phenylaminomethyltrimethoxysilane, and (aminoethylaminomethyl)phenethyltrimethoxysilane. In some embodiments, the porogen includes methanol, ethanol, isopropanol, toluene, THF, acetonitrile, hexane, and combinations thereof.

According to one embodiment, the acid includes acetic acid, hydrochloric acid (HCl), diluted acetic acid, or diluted HCl. The base includes ammonium hydroxide or sodium hydroxide. According to one embodiment, the pH of the working buffer is from about 2 to about 7. According to one embodiment, the ratio of the crosslinking silane to the functional silane is from 1 to 20. According to one embodiment, the ratio of the functional silane to template is from 4 to 40. According to one embodiment, the cross-linker includes tetramethoxysilane, tetraethoxysilane. trimethoxysilane, triethyoxysilane, and combinations thereof. According to one embodiment, the mixing step is from about 5 minutes to about 24 hours. According to one embodiment, the coating step includes dip coating, spin coating or printing (e.g., inkjet or aerosol jet). According to one embodiment, the drying step includes curing at a temperature of from about 60° C. to about 100° C. According to one embodiment, the curing is from about 5 minutes to about 60 minutes.

These and other objects, features and advantages of the present disclosure will become more apparent upon reading the following specification in conjunction with the accompanying description, claims and drawings.

BRIEF DESCRIPTION OF THE DRAWINGS

The accompanying Figures, which are incorporated in and constitute a part of this specification, illustrate several aspects described below.

DETAILED DESCRIPTION

Figure 1:
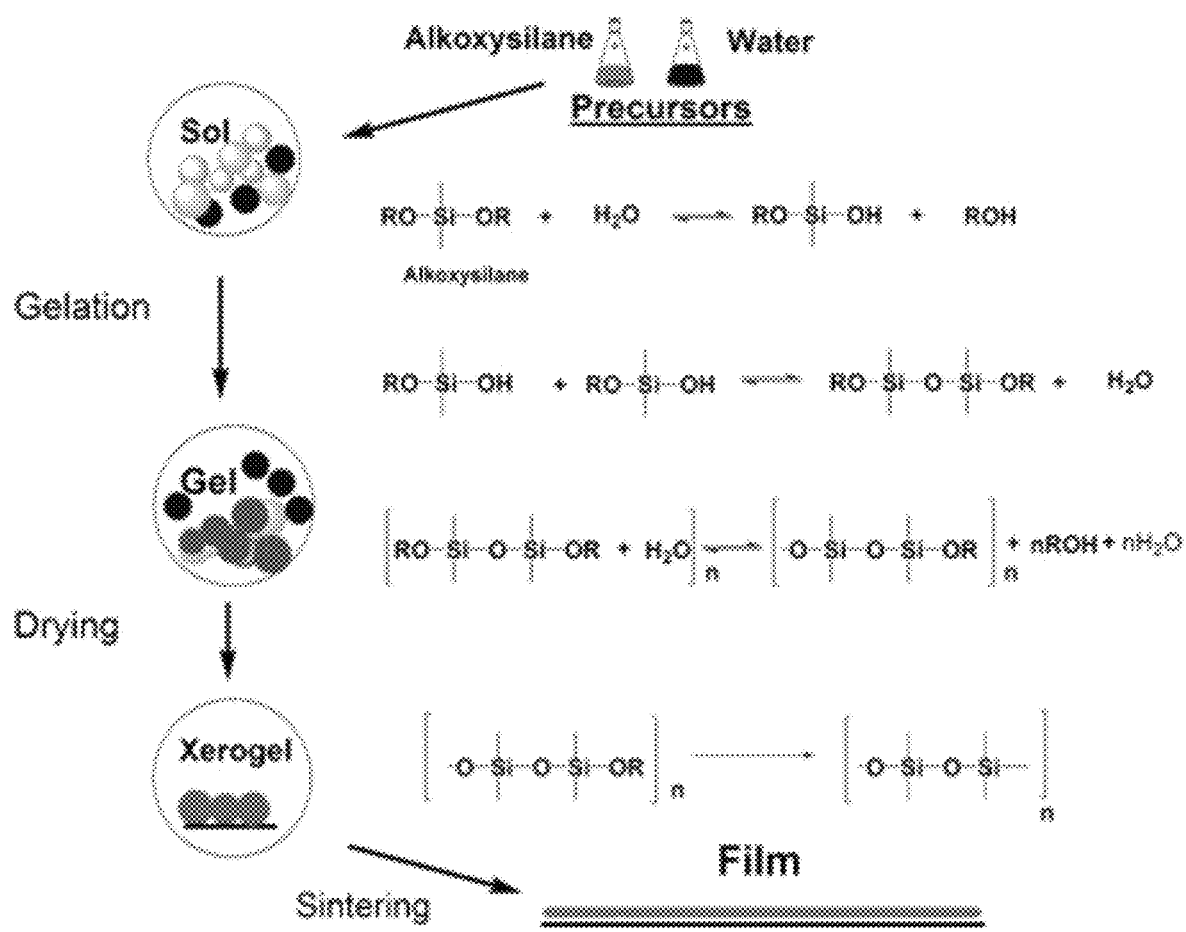
FIG. 1 depicts an exemplary method of sol-gel synthesis of a molecular imprinted polymer according to the disclosure.

There is a great need in the art to identify technologies for detection of certain agricultural analytes and use this understanding to develop novel sensors and sensor components to accurately and specifically detect the chemical. The present disclosure satisfies this and other needs. Embodiments of the present disclosure relate generally to polymer-based sensors for detecting agricultural analytes, and more specifically to stable polymer-based sensing films such as molecular imprinted polymers for incorporation in sensors for detecting agricultural analytes, and methods of making the sensing films and sensors.

To facilitate an understanding of the principles and features of the various embodiments of the disclosure, various illustrative embodiments are explained below. Although exemplary embodiments of the disclosure are explained in detail, it is to be understood that other embodiments are contemplated. Accordingly, it is not intended that the disclosure is limited in its scope to the details of construction and arrangement of components set forth in the following description or examples. The disclosure is capable of other embodiments and of being practiced or carried out in various ways. Also, in describing the exemplary embodiments, specific terminology will be resorted to for the sake of clarity.

As used herein, the term "agricultural analyte" refers to any inorganic contaminants (IOCs), volatile organic contaminants (VOCs), synthetic organic contaminants (SOCs), organic chemicals, inorganic chemicals, small molecule compounds (e.g., low molecular weight organic compounds, sugars, amino acids, fatty acids, lipids, monosaccharides, or metabolites), or disinfection by-products. Chemical contaminants include all common agricultural analytes used on or around a crop such as, for example, herbicides, pesticides, and fertilizers including, but not limited to, auxin growth regulator based herbicides, benzoic acid herbicides, and chlorophenoxy herbicides. Specific agricultural analyte contaminants include dicamba (2-methoxy-3,6-dichlorobenzoic acid), dichloroprop, dichloroprop-P, 2(2, 4, 5-trichlorophenoxy)propionic acid, 2,4,5-trichlorophenoxyacetic acid, 2,4-dichlorophenoxyacetic acid (2,4-D), or any combination thereof.

It must also be noted that, as used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named. In other words, the terms "a," "an," and "the" do not denote a limitation of quantity, but rather denote the presence of "at least one" of the referenced item.

As used herein, the term "and/or" may mean "and," it may mean "or," it may mean "exclusive-or," it may mean "one," it may mean "some, but not all," it may mean "neither," and/or it may mean "both." The term "or" is intended to mean an inclusive "or."

Also, in describing the exemplary embodiments, terminology will be resorted to for the sake of clarity. It is intended that each term contemplates its broadest meaning as understood by those skilled in the art and includes all technical equivalents which operate in a similar manner to accomplish a similar purpose. It is to be understood that embodiments of the disclosed technology may be practiced without these specific details. In other instances, well-known methods, structures, and techniques have not been shown in detail in order not to obscure an understanding of this description. References to "one embodiment," "an embodiment," "example embodiment," "some embodiments," "certain embodiments," "various embodiments," etc., indicate that the embodiment(s) of the disclosed technology so described may include a particular feature, structure, or characteristic, but not every embodiment necessarily includes the particular feature, structure, or characteristic. Further, repeated use of the phrase "in one embodiment" does not necessarily refer to the same embodiment, although it may.

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value. Further, the term "about" means within an acceptable error range for the particular value as determined by one of ordinary skill in the art, which will depend in part on how the value is measured or determined, i.e., the limitations of the measurement system. For example, "about" can mean within an acceptable standard deviation, per the practice in the art. Alternatively, "about" can mean a range of up to ±20%, preferably up to ±10%, more preferably up to ±5%, and more preferably still up to ±1% of a given value.

Where particular values are described in the application and claims, unless otherwise stated, the term "about" is implicit and in this context means within an acceptable error range for the particular value. Throughout this disclosure, various aspects of the disclosure can be presented in a range format. It should be understood that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

Throughout this description, various components may be identified having specific values or parameters, however, these items are provided as exemplary embodiments. Indeed, the exemplary embodiments do not limit the various aspects and concepts of the present disclosure as many comparable parameters, sizes, ranges, and/or values may be implemented.

The terms "first," "second," and the like, "primary," "secondary," and the like, do not denote any order, quantity, or importance, but rather are used to distinguish one element from another.

It is noted that terms like "specifically," "preferably," "typically," "generally," and "often" are not utilized herein to limit the scope of the claimed disclosure or to imply that certain features are critical, essential, or even important to the structure or function of the claimed disclosure. Rather, these terms are merely intended to highlight alternative or additional features that may or may not be utilized in a particular embodiment of the present disclosure. It is also noted that terms like "substantially" and "about" are utilized herein to represent the inherent degree of uncertainty that may be attributed to any quantitative comparison, value, measurement, or other representation.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified.

The materials described hereinafter as making up the various elements of the present disclosure are intended to be illustrative and not restrictive. Many suitable materials that would perform the same or a similar function as the materials described herein are intended to be embraced within the scope of the disclosure. Such other materials not described herein can include, but are not limited to, materials that are developed after the time of the development of the disclosure, for example. Any dimensions listed in the various drawings are for illustrative purposes only and are not intended to be limiting. Other dimensions and proportions are contemplated and intended to be included within the scope of the disclosure.

Films and Sensors of the Disclosure

The films and sensors of the disclosure are adapted to detect the presence of agricultural analytes. An exemplary agricultural analyte that can be detected using the films and sensors as provided herein includes the herbicide, dicamba. Dicamba, 3,6-dichloro-2-methoxybenzoic acid, is classified as either a benzoic acid or chlorophenoxy herbicide. Dicamba is a selective herbicide used to control a wide spectrum of broadleaf weeds and woody plants in various crops, pastures, and turf grass. Dicamba has long been one of the most widely used selective herbicides due to its high efficiency and low toxicity. The introduction of dicamba-resistant genetically modified plants (soybean and cotton) by Monsanto also promoted an increased use of dicamba worldwide. Some U.S. states have, however, banned the sale and use of dicamba because of farmers complaints of drift and damage to nonresistant crops. To monitor the dicamba drift to nonresistant crops, a rapid and sensitive method for dicamba detection is desired. Such methods as provided herein and includes the use of a molecularly imprinted polymer that is incorporated into a sensor and specifically binds to an agricultural analyte such as dicamba. The methods as provided here also extend to all agricultural analytes by adaption of the molecular imprinted polymer such that the molecular imprinted polymer is configured or otherwise adapted to bind to or otherwise detect a target agricultural analyte.

Exemplary sensors that can be combined with molecular imprinted polymers and films thereof include interferometric sensors based on a planar optical waveguide. This transduction platform can detect a wide variety of chemical compounds by monitoring changes in refractive index in a selective, concentrating sensing film. At the heart of the device is the planar optical waveguide with an evanescent field sensitive to changes in the volume immediately above the surface. Optically combining a guided sensing beam with a reference beam generates an interference fringe pattern whose phase changes in proportion to index of refraction differences between the two arms of the interferometer. Applying a chemically selective film over the sensing arm of the interferometer provides the basis for a chemical sensor.

Polymer-based sensing films include hydrogels, molecular imprinted polymers, conducting polymers, and polymer composites. Polymer-based sensing films have been developed to enhance the performance of sensors and biosensors. The diverse polymer chemistries can be easily modified to fine-tune their binding selectivity, reusability, biocompatibility, and long-term stability. Typically, the polymer-based sensing materials contain functional molecules (groups) to capture target molecule, and three-dimensional polymeric matrices to immobilize the functional molecules (groups). Molecular interactions between the analyte and the polymer sensing film are typically used for sensing film design. The interaction can either be physical (via adsorption or swelling), chemical (via reaction of sensing film and target), or biological (via complementary molecular recognition events like DNA binding or receptor/guest interactions in biomolecules). For the chemicals with lower reactivities such as BTEX (benzene, toluene, ethylbenzene and xylene), physical interactions between the analyte and sensing film including adsorption or swelling based sensing films are typically used. For chemicals containing unique functional groups, binding chemistries including hydrogen bonding, acid/base interactions, charge-transfer interactions including $\pi$-$\pi$ stacking, complexation etc. are used to develop selective sensing films.

Molecular imprinted polymers are one type of polymer-based sensing film and are synthetic analogues to natural biological antibody-antigen systems. Molecular imprinted polymers potentially offer the specificity and selectivity of the biological receptors with the explicit advantages of durability with respect to environmental conditions and low cost. For example, polymer-based molecular imprinted polymers commonly do not require special environmental storage and can be applied over a much wider temperature range. Molecular imprinting may be prepared with a solution containing a template (target) molecule, a functional monomer, a cross-linker, a polymerization initiator dissolved in an appropriate solvent. The role of the functional monomer is to form a complex with the template by providing binding sites for one or more agricultural analytes.

The role of cross-linker is to link functional monomers-template complex to a highly cross-linked polymer. The polymerization is initiated to produce molecular assemblies with the polymer chains arranging themselves around the template molecule. The removal of the templates creates analyte-selective binding moieties within the polymer matrix. The majority of molecular imprinted polymers are based on organic polymers synthesized via polymerization from functional and crosslinking monomers containing vinyl or acrylic groups. According to one embodiment, the molecular imprinted materials can be used in an aqueous environment.

Organosilane based sol-gel chemistry can immobilize the functional molecules inside the polymer matrix for selective binding of agricultural analytes due to diverse silanization chemistries. In the sol-gel process, monomers are converted into a colloidal solution (sol) that acts as the precursor for an integrated network (or gel) of either discrete particles or network polymers. Sol-gel is a simple, stable and cost-effective method for the production of homogeneous inorganic polymer network.

As illustrated in FIG. 1, inorganic siloxane bonds may be formed via acid or alkali catalyzed hydrolysis and condensation of a series of silane monomers. Sol then gradually evolves towards the formation of gel-like three-dimensional polymer network. Enclosure of a template agricultural analyte molecule (e.g., dicamba) results in the formation of imprinted media.

Agricultural analyte can be targeted for sensing film design. Hydrogen bonding, charge-transfer complexation, and π-π interaction can be used for selection of functional molecules. Tetramethoxysilane (TMOS) and tetraethoxysilane, and combinations thereof, may be selected as possible cross-linking silanes. Silanes containing amino groups and phenyl groups can be suitable functional silanes, including but not limited to n-(2-n-benzlkaminoethyl)-3-aminopropyltrimethoxysilane hydrochloride, p-aminophenyltrimethoxysilane, n-phenylaminomethyltrimethoxysilane, (aminoethylaminomethyl)phenethyltrimethoxysilane, or combinations thereof. In some embodiments, the silanes include cross-linking silanes, functional silanes, or combinations thereof.

Exemplary crosslinking silanes include, but are not limited to, tetramethoxysilane and tetraethoxysilane, or combinations thereof. Exemplary functional silanes include, but are not limited to, silanes containing amino groups and phenyl groups, preferably n-(2-n-benzylaminoethyl)-3-aminopropyltrimethoxysilane hydrochloride, p-aminophenyltrimethoxysilane, n-phenylaminomethyltrimethoxysilane, (aminoethylaminomethyl)phenethyltrimethoxysilane, or combinations thereof.

In some embodiments, the ratio of the crosslinking silane to the functional silane is from 0.5 to 40. In some embodiments, the ratio of the crosslinking silane to the functional silane is from 0.75 to 30. In some embodiments, the ratio of the crosslinking silane to the functional silane is from 1 to 20.

In some embodiments, the ratio of the functional silane to agricultural analyte template is from 1 to 160. In some embodiments, the ratio of the functional silane to agricultural analyte template is from 2 to 120. In some embodiments, the ratio of the functional silane to agricultural analyte template is from 3 to 80. In some embodiments, the ratio of the functional silane to agricultural analyte template is from 4 to 40.

Once the sol is formed by mixing the agricultural analyte, the silanes, and optionally a porogen for about 1 minutes to about 48 hours. According to another embodiment, the mixing time is from about 3 minutes to about 36 hours. According to another embodiment, the mixing time is from about 5 minutes to about 24 hours.

The sol can be coated onto a pre-cleaned sensor by any number of methods known in the art, including dip coating, spin coating or printing (e.g., inkjet or aerosol jet) the sol onto the sensor. The sol can then be dried by curing the coated sensor to transform the coated sol into a xerogel. Methanol can be flowed over the xerogel film to remove the template molecules, followed by flowing working buffer over the coated sensor surface for baseline registration. In some embodiments, the working buffer has a pH of 0.5 to 9. In some embodiments, the working buffer has a pH of 1 to 8. In some embodiments, the working buffer has a pH of 2 to 7.

In some embodiments, the curing is performed at a temperature of from typically about room temperature to typically about 100° C. In some embodiments, the curing is performed at a temperature of from about 60° C. to about 80° C. In some embodiments, the curing is performed at a temperature of from about 70° C. to about 80° C. In some embodiments, the curing is performed at a temperature of about 75° C.

In some embodiments, the curing time is from about 1 minute to about 180 minutes. In some embodiments, the curing time is from 2.5 minutes to about 120 minutes. In some embodiments, the curing time is from about 5 minutes to about 60 minutes.

In some embodiments, the molecular imprinted polymers is configured to specifically detect dicamba. In some embodiments, the molecular imprinted polymer is configured to detect dicamba or one or more related compounds such as, for example, dichloroprop, dichloroprop-P, 2(2, 4, 5-trichlorophenoxy)propionic acid, 2,4,5-trichlorophenoxyacetic acid, 2,4 dichlorophenoxyacetic acid (2,4-D) or combinations thereof.

The sensitivity and selectivity of the molecular imprinted polymer can be manipulated by one or more of the following. According to one embodiment, the molar ratio of the template molecule (agricultural analyte) to functional molecules inside the molecular imprinted polymer can be fine-tuned, with an exemplary molar ratio of from 1 to 160. According to one embodiment, the molar ratio of the template molecule to functional molecules inside the molecular imprinted polymer is from 2 to 120. According to one embodiment, the molar ratio of the template molecule to functional molecules inside the molecular imprinted polymer is from 5 to 40.

The selection of the porogen can affect the molecular imprinted polymer. According to one embodiment, the porogen can be a polar solvent (e.g., acetonitrile or methanol), a non-polar solvent (e.g., hexane or toluene), and mixtures of polar and non-polar solvents. The hydrolysis time of silane molecules can also be optimized, as well as performing the hydrolysis with a catalyst and/or without a catalyst. The hydrolysis can be performed for a period of from about 5 minutes to about 36 hours. According to another embodiment, the hydrolysis can be performed for a period of from about 2 hours to about 24 hours. According to another embodiment, the hydrolysis can be performed for a period of from about 2 hours to about 18 hours.

The catalyst that can be used with the hydrolysis can be an acid (e.g., HCl or dilute HCl) or a base (ammonium hydroxide or sodium hydroxide. The addition of a catalyst and type of catalyst depends on the speed of the sol formation, such that the hydrolysis occurs at a rate sufficient to form the sol but not so fast that the sol becomes a gel (which may be difficult to coat on the chip). The temperature selected for xerogel formation (e.g., solvent drying temperatures) can alter the molecular imprinted polymer properties, and can include temperatures ranging from ambient or room temperature to about 100° C. The time for xerogel formation can be from about 1 minute to about 180 minutes. According to another embodiment, time for xerogel formation can be from about 2 minutes to about 120 minutes. According to another embodiment, time for xerogel formation can be from about 5 minutes to 60 minutes. These parameters, alone or in any combination, can be adjusted to improve the detection sensitivity and selectivity of the resulting molecular imprinted polymer.

The stability of the molecular imprinted polymer sensing film can also be improved by adjusting the molar ratio of template molecule to functional molecule inside the molecular imprinted polymer, the selection of porogen (e.g., a polar solvent such as acetonitrile or methanol, a non-polar solvent such as hexane or toluene, and mixtures of polar and non-polar solvents), and the storage conditions. Molecular imprinted polymer prepared with high ratios of functional molecule to template molecule produces molecular imprinted polymer that can be formulated as films with superior stability compared to polymers prepared with low ratios of functional molecule to template molecule. The stability of the molecularly imprinted polymer sensing film may be improved by storing the molecular imprinted polymer film in liquids with lower surface tension.

The molecular imprinted polymer can be incorporated into a sensor, such as for example and not limitation an interferometric sensor, an electrochemical based sensor, a surface plasmon based sensor, and a quartz crystal microbalance based sensor. This sensor can be combined with a detection system in order to detect the presence of an agricultural analyte in a variety of different environments, such as, for example, agricultural products (e.g., to detect agricultural analyte drift), food preparation systems (to detect agricultural analyte contamination), and monitoring agricultural analyte residue from sprayers or other delivery means. A sensor that is particularly useful with the molecular imprinted polymers described herein is found in U.S. application Ser. No. 16/454,789 filed Jun. 27, 2019 (incorporated by reference herein in its entirety).

According to a particular embodiment, a sensor and detection system is provided that can be configured to distinguish between chemical analytes via the molecular imprinted polymers described herein.

EXAMPLES

The present disclosure is also described and demonstrated by way of the following examples. The use of these and other examples anywhere in the specification is illustrative only and in no way limits the scope and meaning of the disclosure or of any exemplified term. Likewise, the disclosure is not limited to any particular preferred embodiments described here. Indeed, many modifications and variations of the disclosure may be apparent to those skilled in the art upon reading this specification, and such variations can be made without departing from the disclosure in spirit or in scope. The disclosure is therefore to be limited only by the terms of the appended claims along with the full scope of equivalents to which those claims are entitled.

Example 1

Synthesis of a Dicamba-Based Molecular Imprinted Polymer

Dicamba contains a benzene ring and a carboxylic acid group, which can be targeted for sensing film design. Hydrogen bonding, charge-transfer complexation and π-π interaction can be used for selection of functional molecules. Tetramethoxysilane (TMOS) was selected as the cross-linking silane. A variety of silanes containing amino groups and phenyl groups were examined as the functional silanes. The amounts of monomers, hydrolysis speed, temperature and amount of porogen (i.e., organic solvents or water in aqueous preparations) can be used to determine and optimize the morphology of the polymer.

Materials

Tetramethoxysilane (TMOS), N-phenylaminopropyltrimethoxysilane, N-(2-N-benzylaminoethyl)-3-aminopropyltrimethoxysilane, p-aminophenyltrimethoxysilane, N-phenylaminomethyltrimethoxysilane, (aminoethylaminomethyl)phenethyltrimethoxysilane were obtained from Gelest (Morrisville, PA). Dicamba (Sigma-Aldrich Chemical Co. St. Louis, MO) was used as a template. Chemicals including 2,4-D, citric acid, 2,4-D methyl ester, 2,4-D butyl ester, methanol, toluene and hydrochloric acid were obtained from Sigma-Aldrich (St. Louis, 15 MO). All chemicals were used as received.

Preparation of Sol-Gel Molecularly Imprinted Polymer

Dicamba was first dissolved in methanol and then diluted to toluene. Different ratios of silanes and acid were added to the dicamba solution and the whole mixture was stirred at room temperature overnight. The sol was formed when the reaction was completed. A thin film of sol was coated on a cleaned waveguide sensor using a house-made dip coater. The coated film was cured at room temperature to 100° C. for about 5 minutes to about 60 minutes to obtain a transparent xerogel. The film thickness can be adjusted by changing the dipping rate and the concentration of sol. The coated chip was then placed in a flow cell. Methanol was flowed over the chip at a rate of 2 ml/min for 1 hour to remove the template. The prepared xerogel and the film after the removal of template were characterized using FTIR to determine the molecular imprinted polymers molecular composition and structure.

Figure 8:
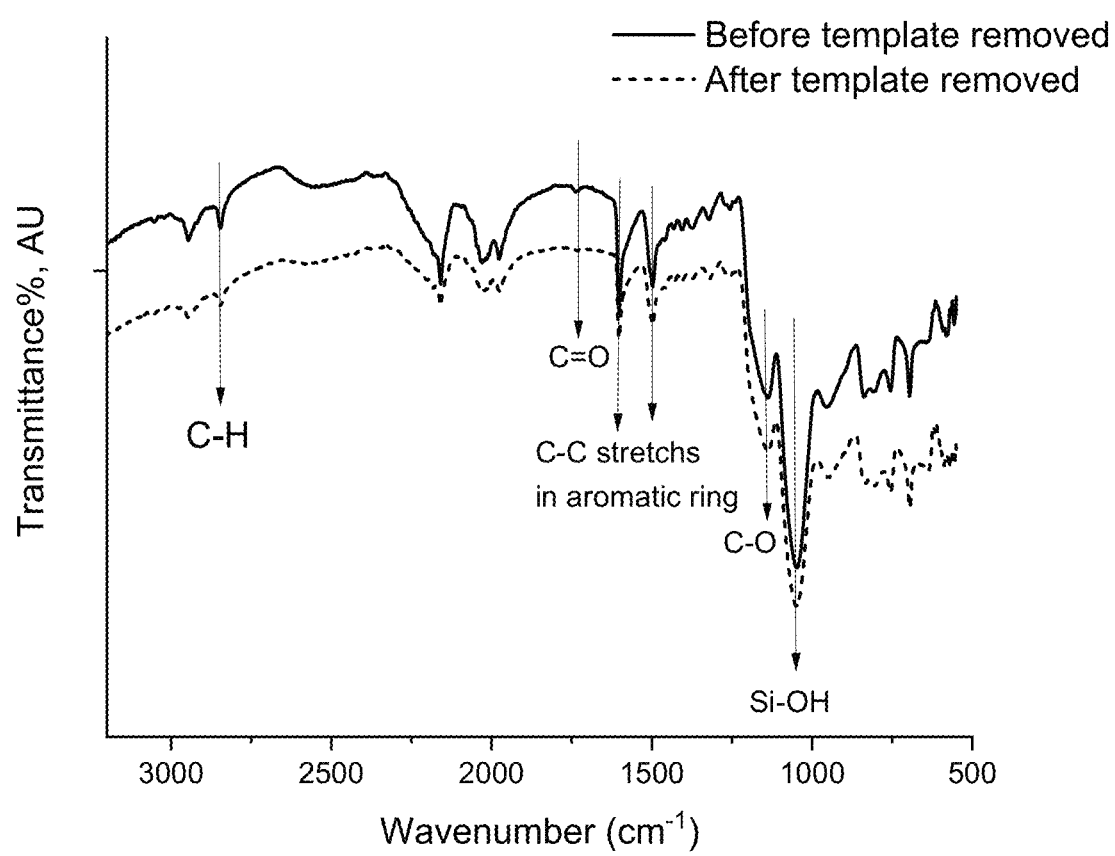
FIG. 8 shows FTIR characterization of the prepared xerogel and the film after the 5 removal of template.

As shown in FIG. 8, the peaks at 1140 and 1030 $cm^{-1}$ were assigned to C—O stretching vibration mode of Si—O—CH₃ and the stretching mode of Si—O—Si while the peak at 2849 $cm^{-1}$ was the C—H stretching vibration and bending vibration mode of Si—O—CH₃. All these peaks were attributed to TMOS. Peaks at 1604 and 1495 $cm^{-1}$ were assigned to C—C stretches in aromatic 30 ring from the functional molecules. The peak at 1738 $cm^{-1}$ was from the carbonyl functional group from the template molecule. The FTIR study indicated that the matrix molecules, functional molecules and template molecules were fully integrated in the molecular imprinted polymer xerogel. After the template was removed, the peak at 1738 $cm^{-1}$ was reduced dramatically.

Sensor Testing

A dicamba stock solution was prepared by dissolving a known amount of dicamba in methanol. A series of dilution was conducted to make dicamba standards with concentrations of 0.1 ppm to 10 ppm in a testing buffer. HCl and NaOH were used to adjust the pH of the testing buffer. NaCl was added to the testing buffer to investigate the effect of ionic strength on the sensing performance. A peristaltic pump was used to deliver the testing solution into the flow cell at 2 ml/min. The baseline was registered first with a testing buffer for 4 minutes and then dicamba solution was delivered over waveguide surface for another 5 minutes to register a sensing response. The waveguide surface was flushed with testing buffer at the end of the sensing assay so all the attached dicamba molecules were removed and the sensing surface was ready for another measurement. The entire sensing response was completed in 15 minutes.

Interference compounds including citrate, 2,4-D esters were prepared in the same testing media and used for specificity characterization.

Results and Discussion

Figure 2:
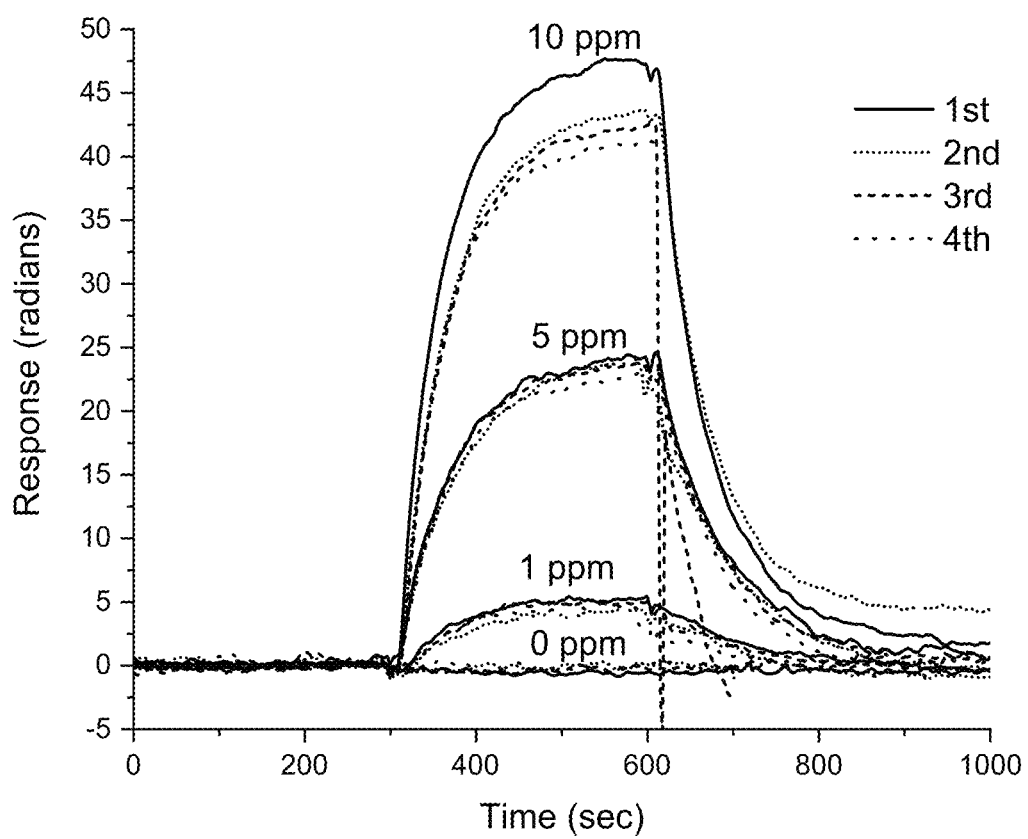
FIG. 2 shows typical sensing responses to dicamba in pH 5 acetate buffer.
Figure 3:
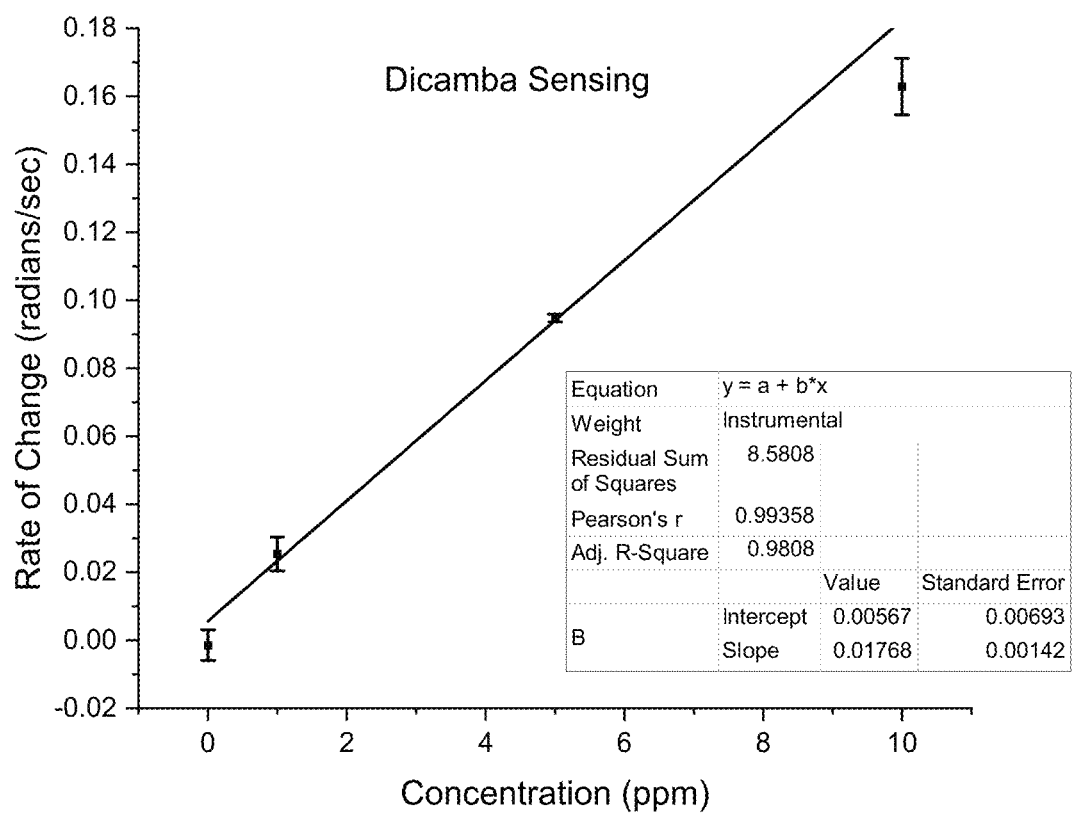
FIG. 3 shows the rate of phase change that was used to build the calibration curve for dicamba.

Fresh made molecular imprinted polymer was tested with dicamba solutions prepared in 0.1M acetate buffer with pH 5 and each solution was tested four times for the reproducibility study. As FIG. 2 showed, the molecular imprinted polymer film was responsive to dicamba and as low as 0.5 ppm of dicamba can be detected. The sensing response was reversible indicating the film can be reused. In addition, the sensing reproducibility was within 10%. A calibration curve may be constructed using either absolute phase change (plateau of the sensing curve) of the rate of phase change (slope of the sensing curves), as shown in FIG. 3. The rate of phase change was preferred for calibration curve because this rate is less influenced by the bulk refractive change caused by matrix change. The same molecular imprinted polymer was tested for sensing selectivity. Molecules with similar structures were tested including dichloroprop, dichloroprop-P, 2(2, 4, 5-trichlorophenoxy)propionic acid, 2,4,5-trichlorophenoxyacetic acid, citric acid, 2,4-dichlorophenoxyacetic acid (2,4-D), and 2,4-D methyl ester, 2,4-D butyl ester.

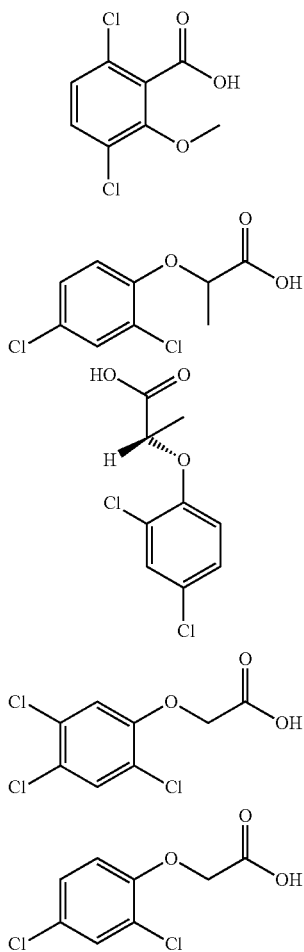

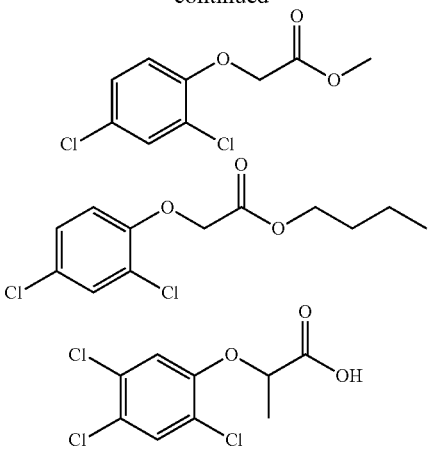

-continued

Figure 4:
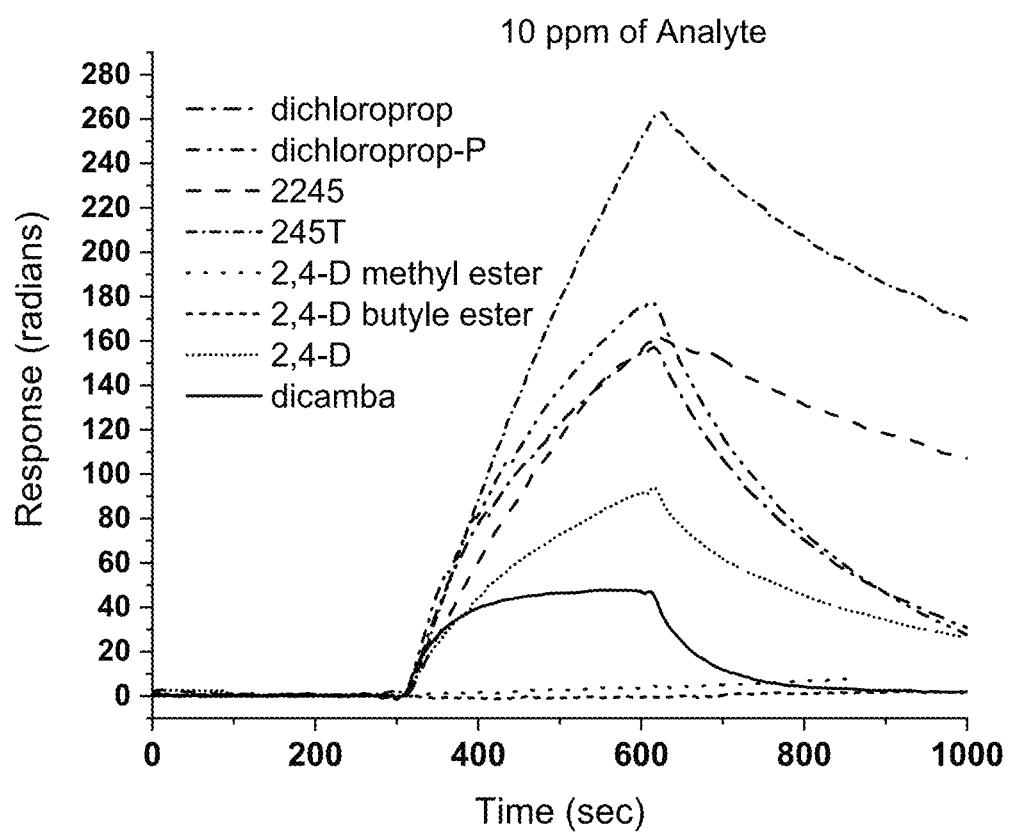
FIG. 4 shows the sensing responses of an inventive film to 10 ppm of molecules with similar structures to dicamba: dichloroprop, dichloroprop-P, 2(2,4,5-trichlorophenoxy) propionic acid, 2,4,5-trichlorophenoxyacetic acid, 2,4-dichlorophenoxyacetic acid (2,4-D), 2,4-D methyl ester, and 2,4-D butyl ester.
Figure 5:
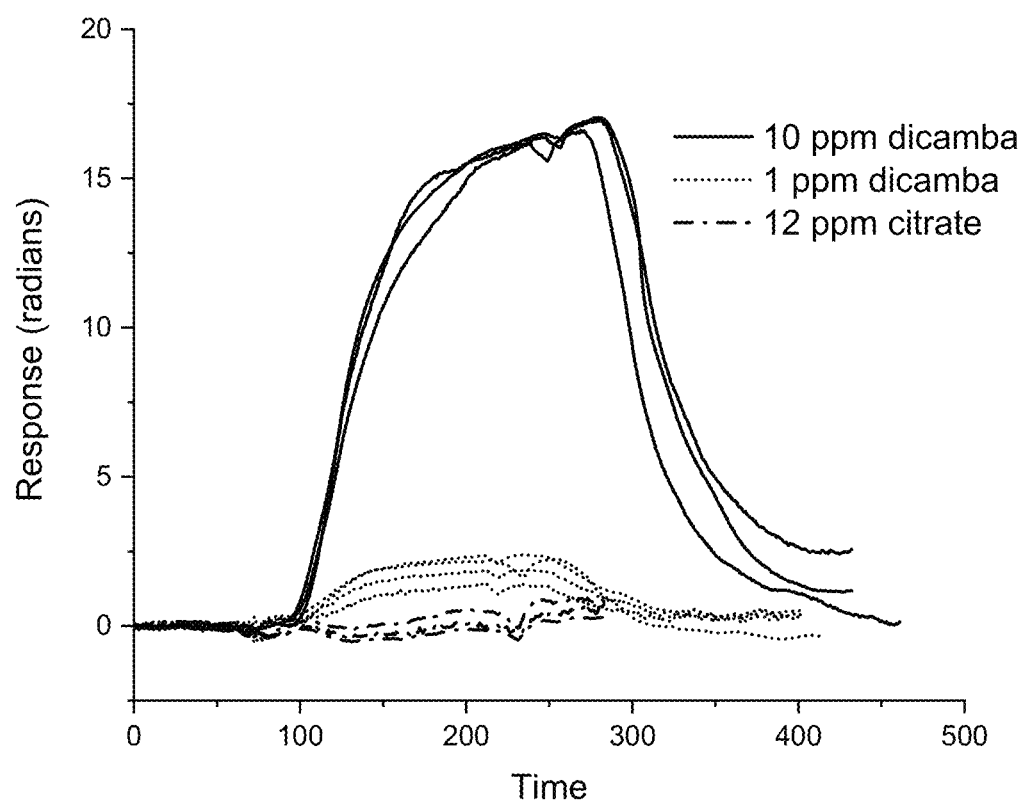
FIG. 5 shows that the optimized molecular imprinted polymer film has no cross-reaction to citric acid.

The sensing responses to 10 ppm of each molecule is shown in FIG. 4. The molecular imprinted polymer did not respond to esters but cross reacted to all organic acids including citric acid. To improve the sensing selectivity, molar ratios of cross-linking monomer to functional monomer (1 to 20) and functional molecules to templates (4 to 40) were examined along with the pH of the testing buffer (pH 2 to pH 7). The optimized molecular imprinted polymer film has no cross-reaction to citric acid as shown in FIG. 5.

Figure 6:
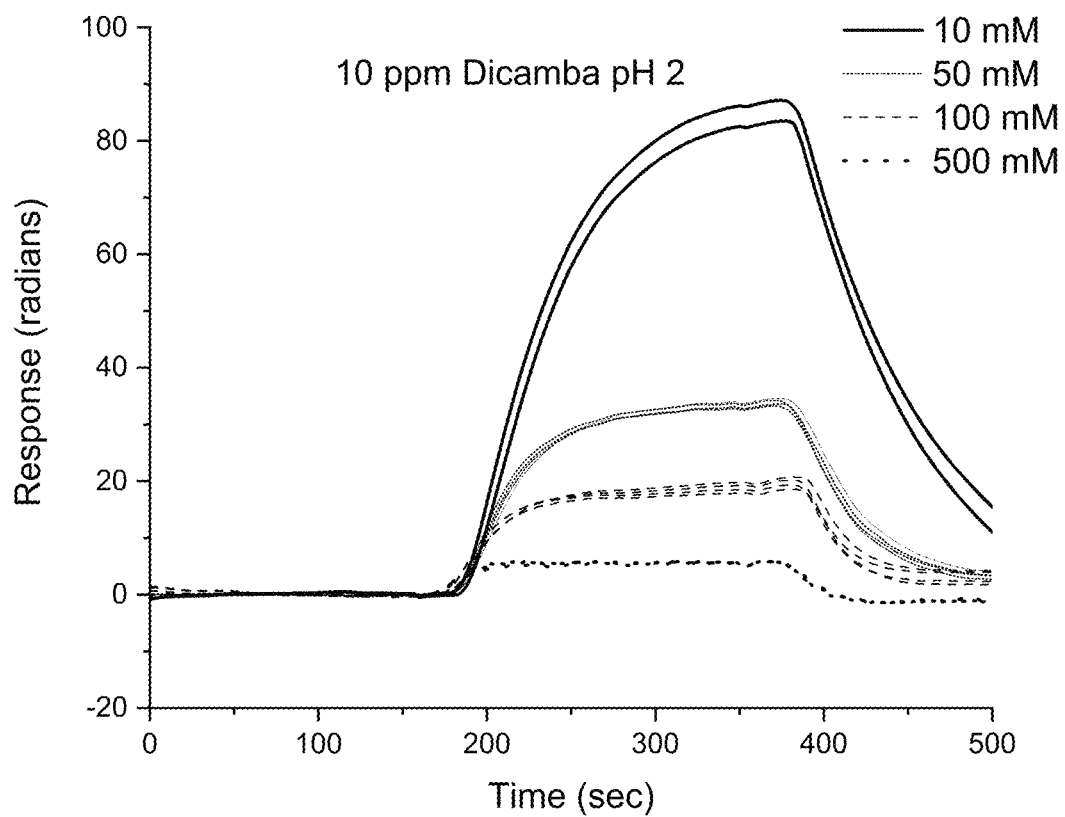
FIG. 6 shows the effect of ionic strength in testing buffer on the detection sensitivity.
Figure 7:
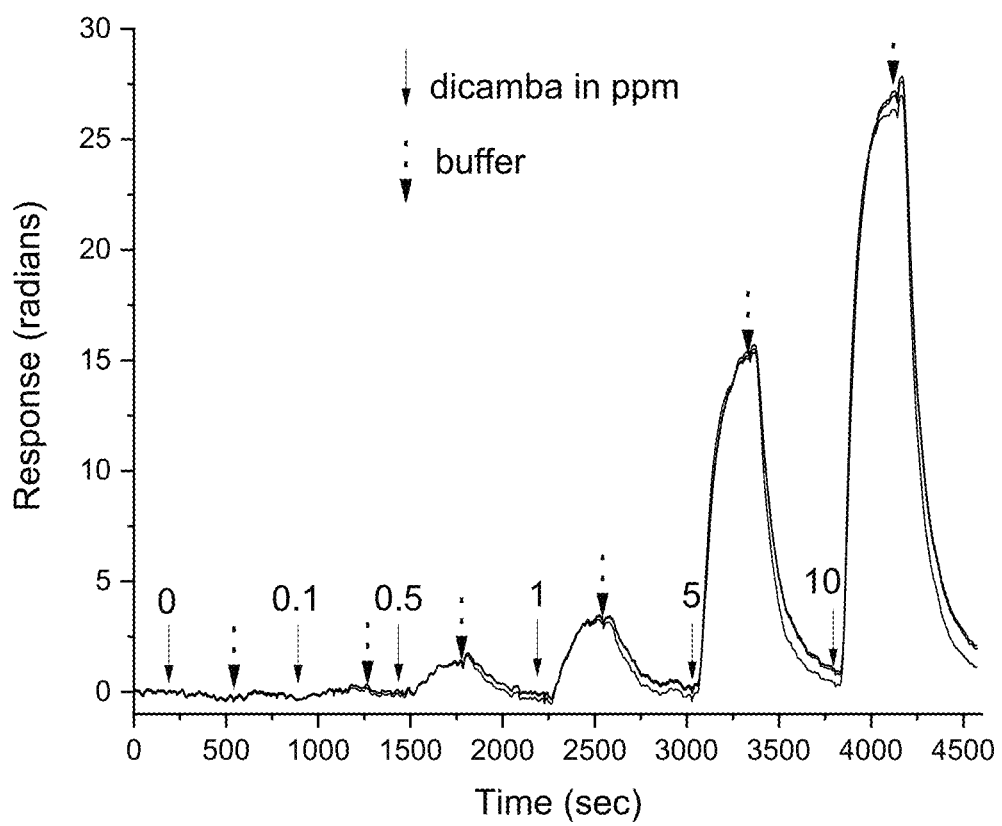
FIG. 7 shows the results of dicamba sensing with a molecular imprinted polymer film according to the disclosure. The arrows indicate solution switching.

To optimize the detection sensitivity, the effect of ionic strength of the testing buffer was investigated, with ionic strengths ranging from ranging from 10 mM to 1 M. It was observed that a better detection sensitivity can be obtained for the testing media with a lower ionic strength as shown in FIG. 6. Although 10 mM of ionic strength provided almost two-fold increased detection response compared to those obtained in 50 mM buffer, the ionic strength of 50 mM was selected for its enhanced buffer strength. The molecular imprinted polymer was tested for a series of dicamba in 50 mM pH 2 buffer. The sensing responses are shown in FIG. 7. The film was sensitive. As low as 0.1 ppm of dicamba was detected.

Figure 9:
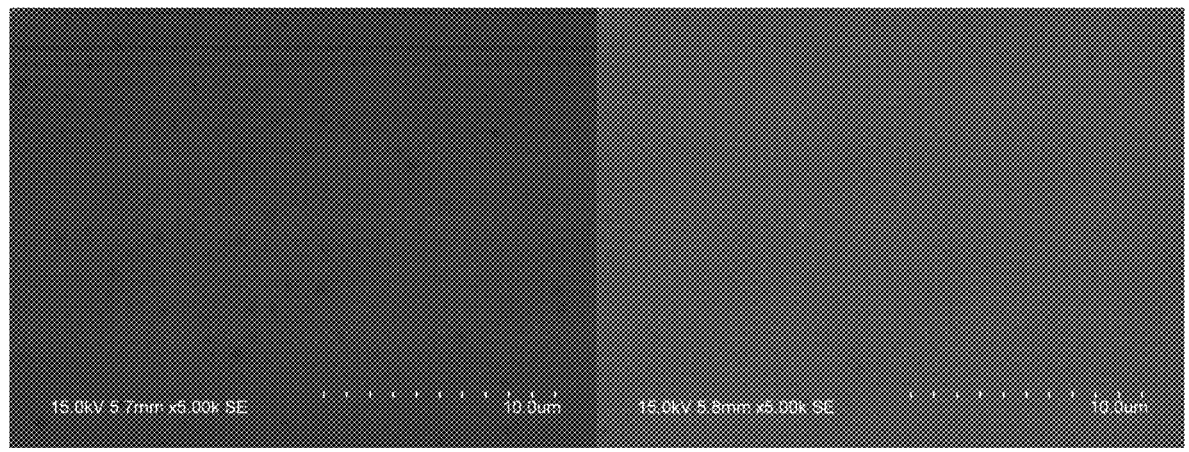
FIG. 9 shows SEM pictures of the molecular imprinted polymer films before (left) and after the template (right) was removed.

Because the voids inside the molecular imprinted polymer were used for herbicide sensing, maintaining the porous structures inside the molecular imprinted polymer was important for providing a stable and reproducible sensing response over time. The impact of molecular imprinted polymer compositions, processing procedures and storage conditions on the stability of sensing film over a long period was determined. The shelf life of the molecular imprinted polymer sensing film was influenced by the composition of the molecular imprinted polymer and the storage conditions. Improper molecular imprinted polymer compositions and storage conditions could cause a collapsed porous structure inside the molecular imprinted polymer films after the template molecules were removed, which resulted in reduced sensing capabilities. A scanning electron microscope (SEM) was used to examine the porous structure of the molecular imprinted polymer and films thereof. FIG. 9 shows SEM pictures of the molecular imprinted polymer films before (left) and after the template (right) was removed. The loss of this porous structure can be clearly seen for molecular imprinted polymers prepared with improper compositions and/or storage conditions.

Figure 10:
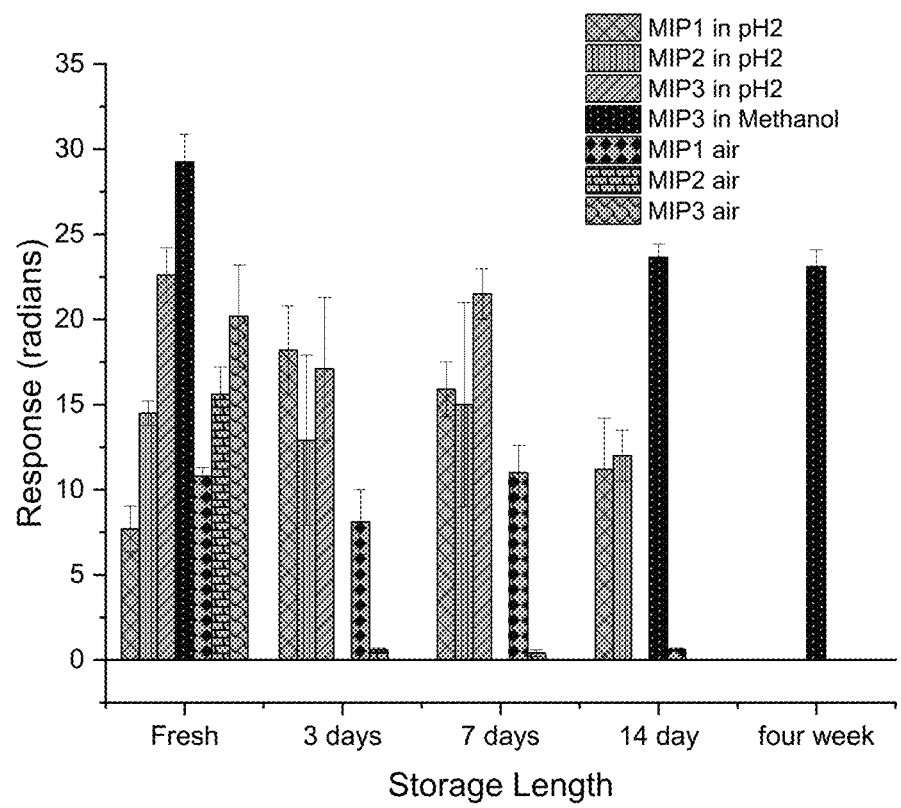
FIG. 10 shows the effect of different storage conditions on molecular imprinted polymer films according to the disclosure.

Molecular imprinted polymer with a higher molar ratio of functional molecules to template molecules produced a stable sensing film compared to the molecular imprinted polymers with a lower molar ratio. In addition, the shelf life of the molecular imprinted polymer was improved by storing the film in liquids with lower surface tensions (e.g., methanol). The stability results can be found in FIG. 10.

While several possible embodiments are disclosed above, embodiments of the present disclosure are not so limited. These exemplary embodiments are not intended to be exhaustive or to unnecessarily limit the scope of the disclosure, but instead were chosen and described in order to explain the principles of the present disclosure so that others skilled in the art may practice the disclosure. Indeed, various modifications of the disclosure in addition to those described herein will become apparent to those skilled in the art from the foregoing description. Such modifications are intended to fall within the scope of the appended claims.

What is claimed is:

1. A molecularly imprinted polymer in the form of a xerogel film, the molecularly imprinted polymer comprising:
   a crosslinking organosilane;
   a functional organosilane;
   a template molecule and
   a porogen;
   wherein the molecularly imprinted polymer in the form of a xerogel film is configured to detect one or more agricultural analytes.

2. The molecularly imprinted polymer of claim 1, wherein the agricultural analyte is one or more of an inorganic contaminant (IOC), volatile organic contaminant (VOC), synthetic organic contaminant (SOC), organic chemical, inorganic chemical, disinfection by-product, or a combination thereof.

3. The molecularly imprinted polymer of claim 1, wherein the agricultural analyte is one or more of dicamba, dichloroprop, dichloroprop-P, 2(2, 4, 5-trichlorophenoxy)propionic acid, 2,4,5-trichlorophenoxyacetic acid, and 2,4-dichlorophenoxyacetic acid (2,4-D).

4. The molecular imprinted polymer of claim 1, wherein the crosslinking organosilane comprises tetramethoxysilane, tetraethoxysilane, trimethoxysilane, triethoxysilane or combinations thereof.

5. The molecular imprinted polymer of claim 1, wherein the functional organosilane comprises n-(2-n-benzylaminoethyl)-3-aminopropyltrimethoxysilane hydrochloride, p-aminophenyltrimethoxysilane, n-phenylaminomethyltrimethoxysilane, (aminoethylaminomethyl)phenethyltrimethoxysilane, or combinations thereof.

6. The molecular imprinted polymer of claim 1, wherein the porogen comprises methanol, ethanol, isopropanol, toluene, THF, acetonitrile, hexane, or combinations thereof.

7. The molecular imprinted polymer of claim 1, having a ratio of the crosslinking organosilane to the functional organosilane of 1 to 20.

8. The molecular imprinted polymer of claim 1, having a ratio of the functional organosilane to the template molecule of 4 to 40.

9. The molecularly imprinted polymer of claim 1, wherein the molecularly imprinted polymer in the form of a xerogel film is incorporated in an interferometric sensor.

\* \* \* \* \*